US009677585B2

(12) United States Patent
Broussard et al.

(10) Patent No.: US 9,677,585 B2
(45) Date of Patent: Jun. 13, 2017

(54) BEAM CLAMP

(71) Applicant: National Oilwell Varco, L.P., Houston, TX (US)

(72) Inventors: Justin Dallas Broussard, Lafayette, LA (US); Neil James Boudreaux, Broussard, LA (US)

(73) Assignee: National Oilwell Varco, L.P., Houston, TX (US)

( * ) Notice: Subject to any disclaimer, the term of this patent is extended or adjusted under 35 U.S.C. 154(b) by 71 days.

(21) Appl. No.: 14/549,988

(22) Filed: Nov. 21, 2014

(65) Prior Publication Data

US 2016/0040702 A1    Feb. 11, 2016

Related U.S. Application Data

(60) Provisional application No. 62/035,094, filed on Aug. 8, 2014.

(51) Int. Cl.
  *F16B 7/04*    (2006.01)
  *F16B 2/06*    (2006.01)
  *E04B 1/24*    (2006.01)

(52) U.S. Cl.
  CPC ............ *F16B 7/0493* (2013.01); *F16B 2/065* (2013.01); *E04B 2001/2415* (2013.01); *E04B 2001/2448* (2013.01); *E04B 2001/2457* (2013.01)

(58) Field of Classification Search
  CPC .......... F16B 7/0493; F16B 2/065; E04B 1/40; E04B 2001/2415; E04B 2001/2448; E04B 2001/2457; E04B 1/5812

USPC ........ 248/201, 228.1, 228.2, 220.1; 52/665; 403/387

See application file for complete search history.

(56) References Cited

U.S. PATENT DOCUMENTS

RE17,629 E  *  3/1930  Wehr ................... B65G 9/008
                                              104/111
3,049,323 A  *  8/1962  Peterka ................ A47G 1/215
                                              248/201
3,144,105 A  *  8/1964  Capek .................. E04B 1/2403
                                              24/335

(Continued)

OTHER PUBLICATIONS

Beam Clamp for T-Comp Drawing No. 107-356, Devin International, Inc., Nov. 6, 2006 (2 pages).

(Continued)

*Primary Examiner* — Anita M King
(74) *Attorney, Agent, or Firm* — Winthrop & Weinstine, P.A.

(57) ABSTRACT

A beam clamp for securing a first beam to a second beam where the first and second beams are arranged in crossing fashion and define one or more quadrants, the beam clamp including a first clamping portion having a first clamping surface configured to engage a beam flange, a second clamping portion having a second clamping surface configured to engage a beam flange and being arranged in opposing relation to the first clamping surface defining a mouth, a base portion extending between the first and second clamping surfaces and having a wedge shape for engaging a corner defined by flanges of the crossing beams, and a securing mechanism configured for extending from one of the first and second clamping surfaces, into the mouth, to engage a surface a beam flange thereby pinching the flanges of the crossing beams together.

15 Claims, 16 Drawing Sheets

(56) References Cited

U.S. PATENT DOCUMENTS

| | | | | |
|---|---|---|---|---|
| 5,146,724 | A * | 9/1992 | Angelo | F16B 2/02 |
| | | | | 248/228.1 |
| 6,499,158 | B1 * | 12/2002 | Easterling | A61G 15/10 |
| | | | | 248/231.61 |
| 8,167,258 | B1 * | 5/2012 | Wentworth | E04B 1/2403 |
| | | | | 248/214 |
| 2011/0047925 | A1 * | 3/2011 | Gan | E04B 1/2403 |
| | | | | 52/653.1 |

OTHER PUBLICATIONS

"For Rig-less Production Facilities-Hydraulic Beam Clamps & Skidding System", from Professional Rental Tools: Equipment and Services Presentation dated Oct. 8, 2013 (p. 12).

* cited by examiner

BEAM CLAMP

CROSS-REFERENCE TO RELATED APPLICATIONS

The present application claims priority to U.S. Provisional Patent Application No. 62/035,094 entitled Mechanical Beam Clamp, filed on Aug. 8, 2014, the content of which is hereby incorporated by reference herein in its entirety.

FIELD OF THE INVENTION

The present disclosure relates to a mechanical beam clamp for securing a beam or other platform to another beam or platform in order to stabilize a tower or assembly. More particularly, the present disclosure relates to a mechanical beam for substantially securing a beam using a friction fit. Still more particularly, the present disclosure relates to a relatively light weight mechanical beam clamp designed to quickly secure a transfer beam to a rig beam.

BACKGROUND OF THE INVENTION

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A mechanical beam clamp is traditionally used to secure a transfer beam, or "Devin" beam, to a rig beam. Transfer beams are commonly arranged perpendicular to one or more rig beams on a rig platform allowing support structures, towers, drilling equipment and other equipment to be supported by the transfer beam and in regions between rig beams. The transfer beam is commonly secured to the rig beam in order to stabilize the beam and the supported structure, tower, and equipment. Several present approaches to securing the transfer beams are problematic.

In the case of welding, the equipment, labor, preparation, and time may cause this option to be expensive. In addition, it is relatively invasive to the existing rig, particularly if the transfer beams are to later be moved, requiring grinding of the welds resulting in damage to the rig beams. In some cases, welding may also involve shutting down the rig. Thus, a beam clamp is typically preferred.

Beam clamps have many drawbacks. Traditionally, beam clamps are not universal and, in order to ensure a secure connection, the clamps may need to be customized using multiple plates, bolts, spacers, etc. Still further, traditional beam clamps are cumbersome and very heavy, i.e., 500-700 pounds, often calling for a crane to lift them into place. Another problem is that the torque required to secure the bolts is often quite high, approximately 470 ft. lbs. each, and is difficult to apply by hand. These and other factors cause traditional beam clamps to be slow to assemble, install, and/or uninstall or disassemble. Safety is yet another concern because they can contain several pinch points.

BRIEF SUMMARY OF THE INVENTION

The following presents a simplified summary of one or more embodiments of the present disclosure in order to provide a basic understanding of such embodiments. This summary is not an extensive overview of all contemplated embodiments, and is intended to neither identify key or critical elements of all embodiments, nor delineate the scope of any or all embodiments.

In one or more embodiments, a beam clamp for securing a first beam to a second beam may be used in conjunction with a first and second beam that are arranged in crossing fashion and define one or more quadrants. The beam clamp may include a first clamping portion having a first clamping surface configured to engage a beam flange. The beam clamp may also include a second clamping portion having a second clamping surface configured to engage a beam flange and being arranged in opposing relation to the first clamping surface defining a mouth. The beam clamp may also include a base portion extending between the first and second clamping surfaces and having a wedge shape for engaging a corner defined by flanges of the crossing beams. The beam clamp may also include a securing mechanism configured for extending from one of the first and second clamping surfaces, into the mouth, to engage a surface a beam flange thereby pinching the flanges of the crossing beams together.

In one or more embodiments, a beam clamp assembly may be provided for securing a first beam to a second beam. The first and second beams may be arranged in crossing fashion and define one or more quadrants. The beam clamp assembly may include a plurality of beam clamps each arranged in a quadrant. Each of the beam clamps may include a first clamping portion having a first clamping surface configured to engage a beam flange. The beam clamps may also include a second clamping portion having a second clamping surface configured to engage a beam flange and being arranged in opposing relation to the first clamping surface defining a mouth. The beam clamps may also include a base portion extending between the first and second clamping surfaces and having a wedge shape for engaging a corner defined by flanges of the crossing beams. The beam clamp may also include a securing mechanism configured for extending from one of the first and second clamping surfaces, into the mouth, to engage a surface a beam flange thereby pinching the flanges of the crossing beams together. The beam clamp assembly may also include a brace comprising a substantially elongate member extending parallel to one of the crossing beams and securing one of the beam clamps to another beam clamp in an adjacent quadrant.

In some embodiments, a beam clamp for securing a first beam to a second beam may be provided. The clamp may include a base section configured for arrangement on and mechanically clamping to a beam flange of the second beam. The clamp may also include a securing awning extending from the base section across a flange of the first beam and configured to mechanically impinge on the flange of the first beam.

While various embodiments are disclosed, still other embodiments of the present disclosure will become apparent to those skilled in the art from the following detailed description, which shows and describes illustrative embodiments of the invention. As will be realized, the various embodiments of the present disclosure are capable of modifications in various obvious aspects, all without departing from the spirit and scope of the present disclosure. Accordingly, the drawings and detailed description are to be regarded as illustrative in nature and not restrictive.

BRIEF DESCRIPTION OF THE DRAWINGS

While the specification concludes with claims particularly pointing out and distinctly claiming the subject matter that is regarded as forming the various embodiments of the present disclosure, it is believed that the invention will be better understood from the following description taken in conjunction with the accompanying Figures, in which:

DETAILED DESCRIPTION

The present disclosure, in some embodiments, relates to a beam clamp for securing and connecting a beam, e.g., an I-beam, to another beam or surface. In particular, in some embodiments, the beam clamp may be used to secure a transfer beam to a support beam, such as, for example, a rig beam on an offshore oil platform. The presently described beam clamps may be designed with fewer parts, be light weight, and be assembled in a manner particularly adapted to reduce the time of installation. For example, in lieu of separate plates, bolts, and spacers, in some embodiments, the mechanical beam clamp may be generally comprised of a single assembly that has a mouth large enough to receive a wide range of beam flange thicknesses. Still further, the clamps may have portions removed to decrease weight without decreasing strength. In addition, the bolt arrangement may be such as to reduce the amount of torque needed to secure the clamp. Together, these features may make for a clamp that is much more useable, installable without a crane, and much faster than current approaches.

In particular, the beam clamp may be used for securing a transfer beam to a support beam on a drilling platform or rig, for example, where a beam assembly may include transfer beams that may be arranged to span across spaces between parallel extending rig beams and which may be secured to the rig beams to increase stability. Drilling platforms may commonly include lightweight flooring able to support workers, but which is not well suited for supporting heavy structures or loads. However, the more lightweight flooring may be supported by a series of rig beams that are more suitable for supporting heavy equipment. For example, structures, towers, or other equipment may be connected to one or more transfer beams which may be positioned to span from one rig beam to another. Traditionally, the rig beams may lay parallel to each other. One or more transfer beams may be positioned on top of the rig beams to span from one rig beam to another. The transfer beams may be arranged parallel to each other but perpendicular to the rig beams. The presently disclosed beam clamps may be used to secure the transfer beams to the rig beams thereby more securely supporting any associated structures, towers, or equipment. In some embodiments one or more beam clamps may be used on each side of each transfer beam and at the location where the beam rests on a supporting rig beam, for example.

Figure 1:
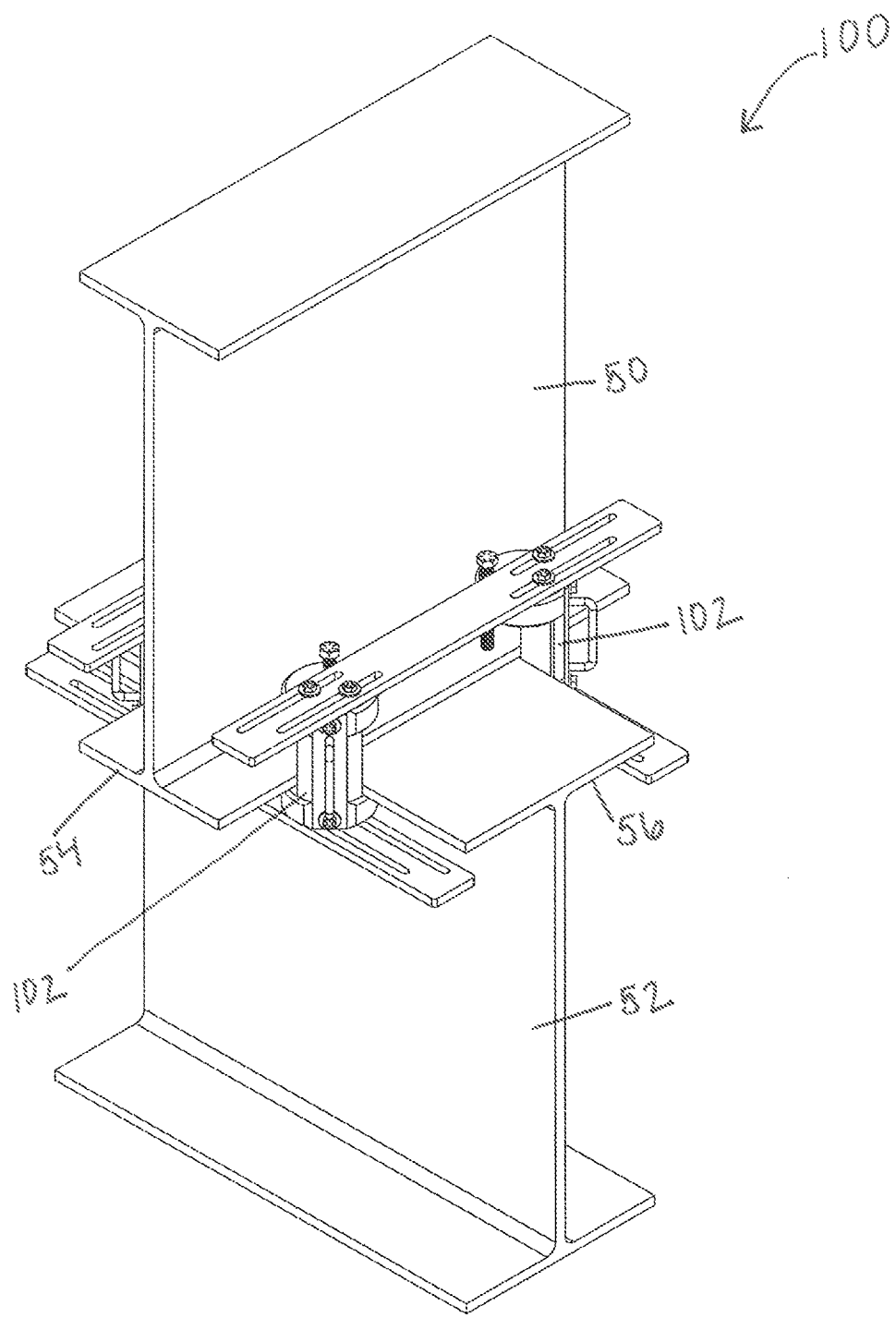
FIG. 1 is a perspective view of a beam clamp assembly, according to one or more embodiments.

Referring to FIG. 1, a beam clamp assembly 100 is shown. As shown, a transfer beam 50 may be used to span across a space between a pair of support beams 52 and rest on one of the support beams 52. The transfer beam 50 may be secured to the support beam 52 with a clamp assembly 100. In some embodiments, the clamp assembly 100 may include one, two, three, four, or more beam clamps 102. As shown, the beam clamps 102 may be arranged in one or more of the quadrants defined by the intersecting beams 50, 52. For example, the bottom flange 54 of the transfer beam 50 may intersect and cross the top flange 56 of the support beam 52. The "plus sign" formation when viewed from above may define four quadrants and a beam clamp 102 may be positioned in one or more of the quadrants and, in some embodiments, each of the quadrants. In some embodiments, the transfer beam 50 may be generally or substantially perpendicular to the support beam or beams 52. In other embodiments, the transfer beam 50 may be skewed relative to the support beam 52. In addition, the beam clamps 102 may be secured, tied, or otherwise connected or coupled to one another with a series of braces.

Figure 2:
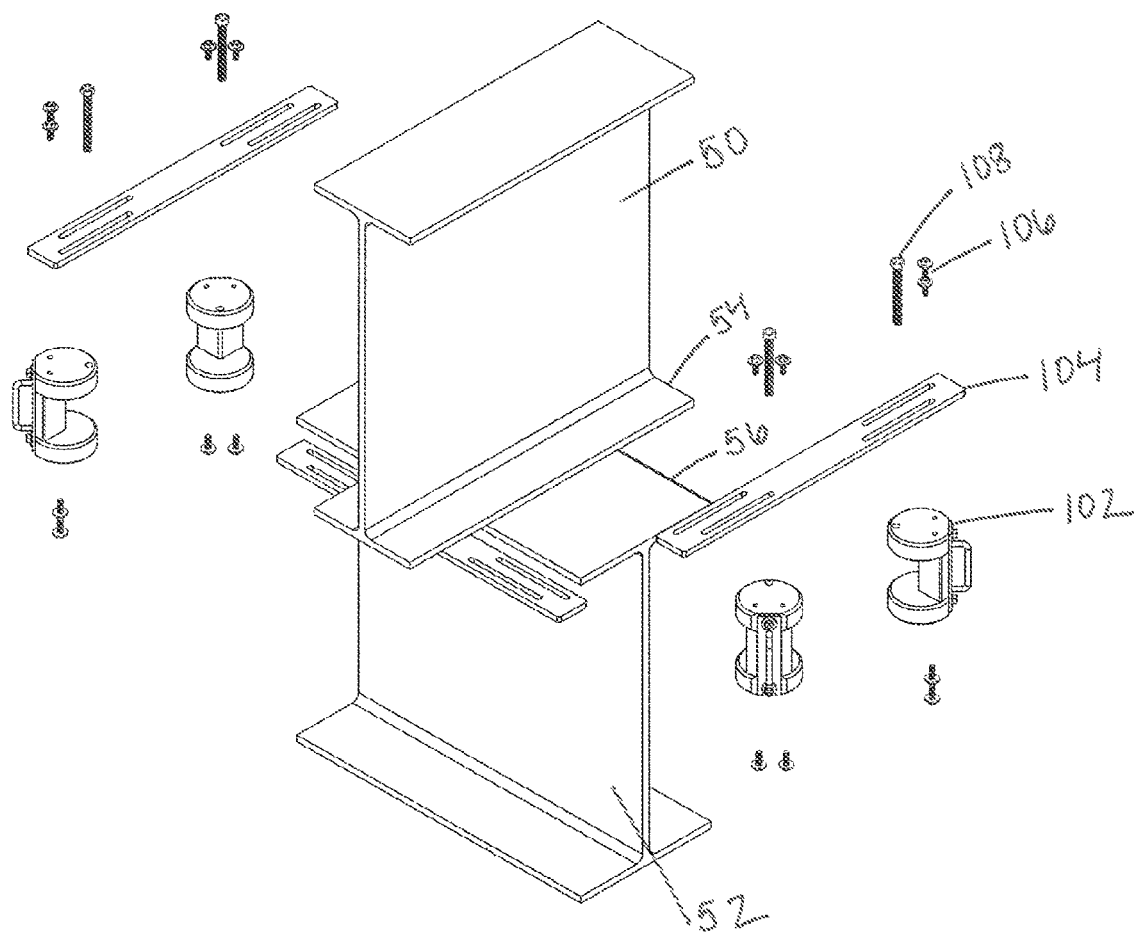
FIG. 2 is an exploded view of the beam clamp assembly of FIG. 1, according to one or more embodiments.

Referring to FIG. 2, an exploded view of the assembly 100 is shown. The exploded view may more clearly show the various portions of the beam assembly 100 including the beam clamps 102 and the braces 104. The braces 104 may be secured to the top and/or bottom of the clamps 102 with one or more securing fasteners 106. In addition, the clamps 102 may include a position setting fastener 108 for engaging the transfer beam 50 and pinching the bottom flange 54 of the transfer beam 50 against the top of flange 56 of the support beam 52.

Figure 3:
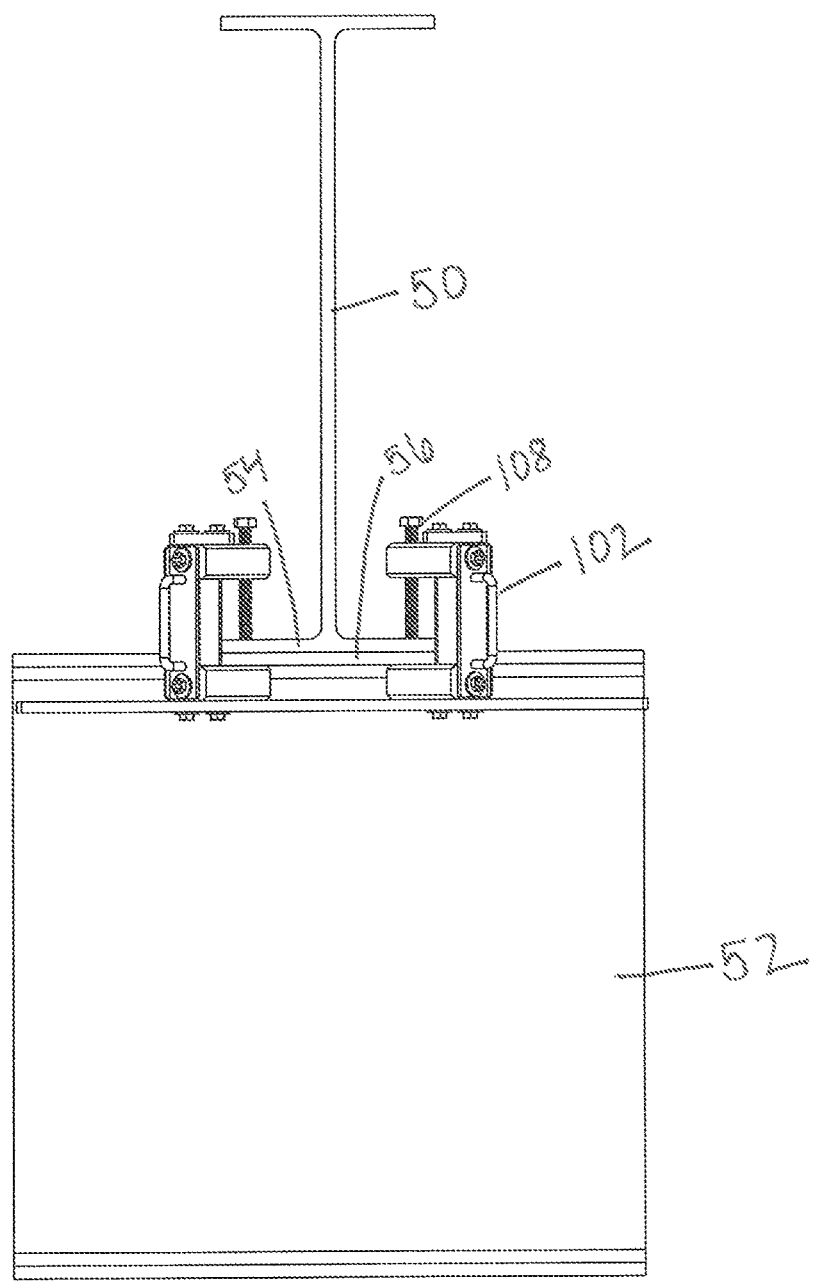
FIG. 3 is a side view of the beam clamp assembly of FIG. 1 from the vantage point of looking along the length of a transfer beam, according to one of more embodiments.
Figure 4:
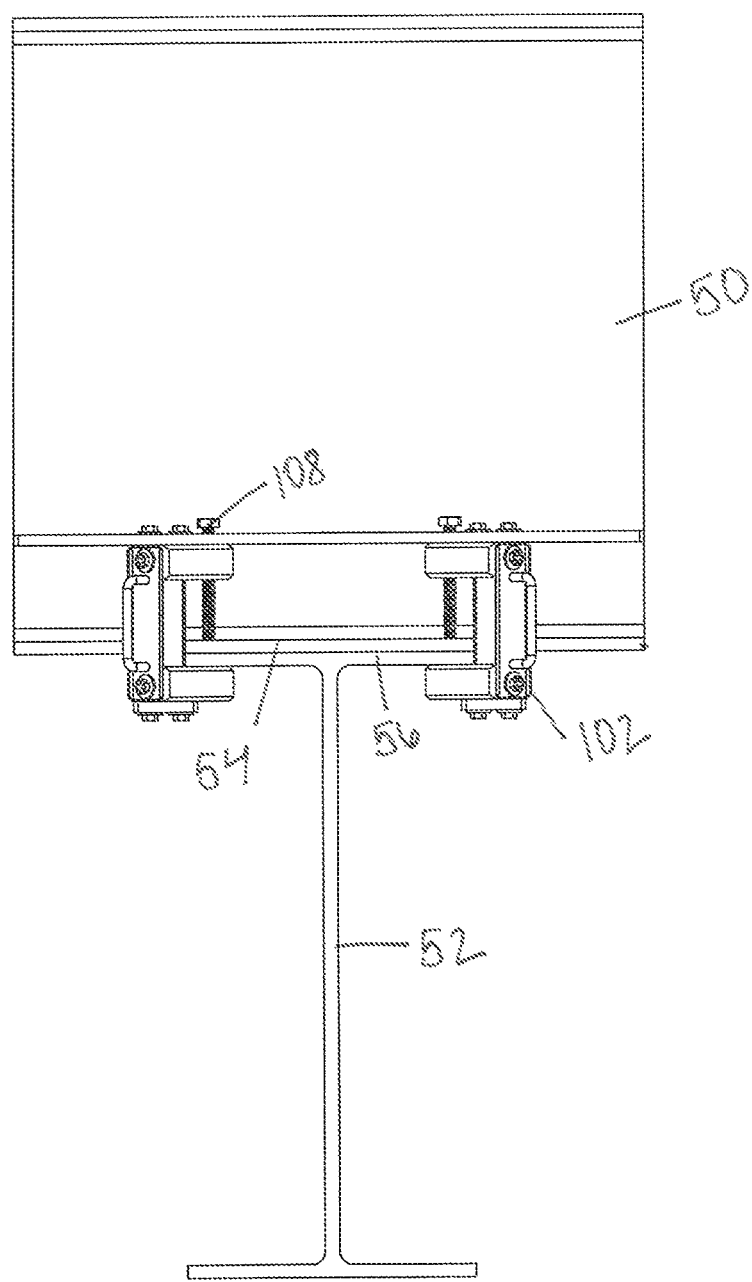
FIG. 4 is a side view of the beam clamp assembly of FIG. 1 from the vantage point of looking along the length of a support beam, according to one of more embodiments.

FIG. 3 shows a side view of the beam clamp assembly 100 in place on a beam and from a vantage point of looking along the length of the transfer beam 50. FIG. 4 shows a side view of the beam clamp assembly 100 in place on a beam and from a vantage point of looking along the length of the support beam 52. As shown in both figures, the beam clamps 102 may extend below the bottom surface of the top flange 56 of the support beam 52 and across and spaced above the top surface of the bottom flange 54 of the transfer beam 50. The position setting fastener 108 may be used to engage the top surface of the bottom flange 54 of the transfer beam 50 thereby pinching the bottom flange 54 of the transfer beam 50 against the top flange 56 of the support beam 52 and against a bottom portion or securing plate of the beam clamp 102.

Figure 5:
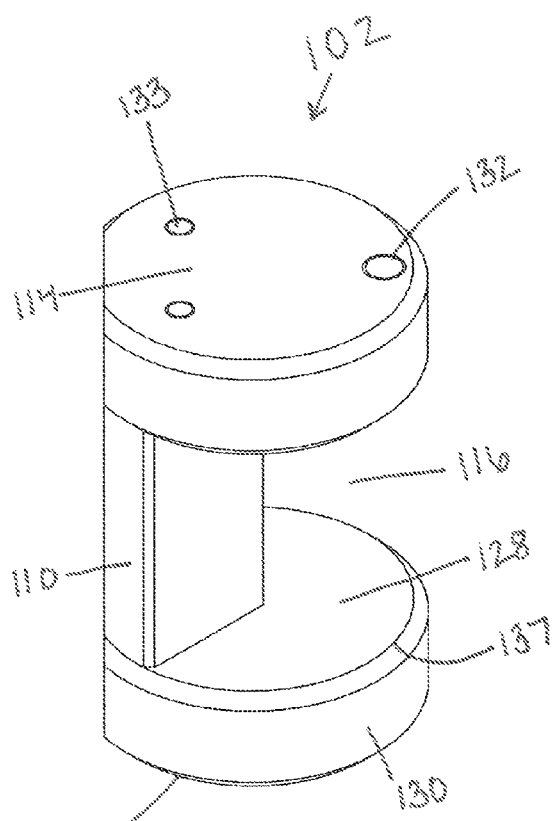
FIG. 5 is a perspective view of a beam clamp of the assembly of FIG. 1, according to one of more embodiments.

Referring now to FIG. 5, a perspective view of a beam clamp 102 is shown. As shown, the beam clamp may include a base portion 110, a securing or bottom plate or portion 112 and a top plate or portion 114. The beam clamp 102 may be configured for positioning in a quadrant defined by a pair of intersecting beams 50, 52 and may be further configured for pinching or otherwise securing the intersecting beams 50, 52. In particular, the beam clamp 102 may be partly jaw-shaped defining a mouth 116 and may be configured to receive a portion of each of the overlapping members within the mouth 116 and may be further configured to bite down on the portion of the members thereby pinching the two members together.

Figure 8:
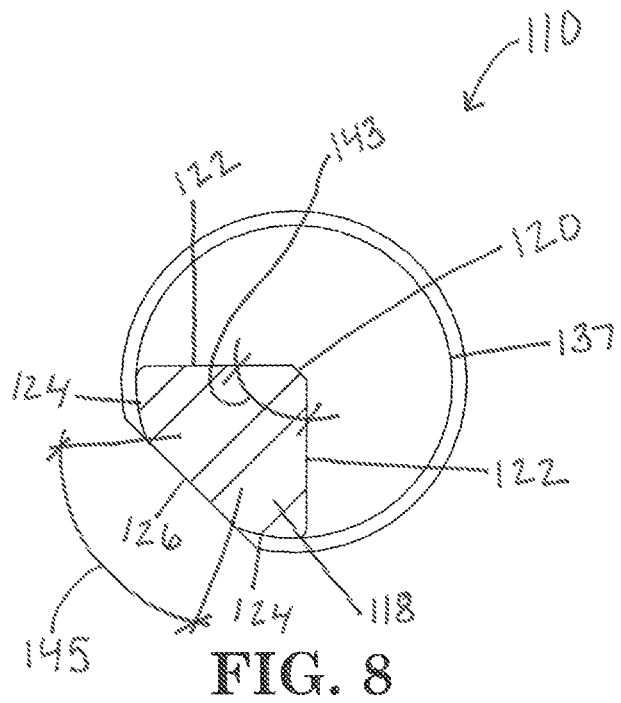
FIG. 8 is a cross-sectional view of the beam clamp of FIG. 5, according to one of more embodiments.

As shown in FIG. 5 and in cross-section in FIG. 8, the base portion 110 may have a defined cross-section and may extend upwardly and downwardly between the top portion 114 and the bottom portion 112. As shown in FIG. 8, the base portion 110 may include a diamond-shaped cross-section 118. The tip 120 of the diamond 118 may be arranged at or near a center point, which may include a center point falling on a vertical axis extending from the center of a circular bottom portion 112 to a center of a circular top portion 114. As shown, the tip 120 of the diamond-shaped cross-section 118 may be chamfered slightly. With continued reference to the cross-sectional shape 118, from the tip 120, a pair of side walls 122 may extend away from the tip and radially outwardly away from the axis toward an outer perimeter 137 defined by a generally circular clamping surface of the top 114 and bottom 112 portion. The side walls 122 may define an included angle 143 ranging from approximately 30 degrees to approximately 120 degrees, or from approximately 45 degrees to approximately 105 degrees, or approximately 90 degrees. The included angle 143 may define the geometry of the wedge shaped point of the diamond shaped base portion 110. The walls 122 may extend radially outward to a pair of return walls 124 having an arcuate surface and extending along the circular perimeter toward one another. The base portion 110 may include a back wall 126 defined by a chamfered portion of the circular perimeter and extending between each of the return walls 124. The length of the back wall 126 may be defined by an include angle 145 ranging from approximately 15 degrees to approximately 105 degrees or approximately 30 degrees to approximately 80 degrees or approximately 75 degrees. As shown, the cross-section of the base portion 110 may be substantially equal to a ¼ pie portion of a circular perimeter 137 and having a chamfered back wall 126, which may leave approximately ¾ pie portion of the circular clamping surface exposed. The cross-section of the base portion 110 may be particularly adapted to engage the intersecting flanges 54, 56 of the beams 50, 52. For example, where the beams 50, 52 are arranged perpendicularly to each other, a 90 degree included angle 143 of the side walls 122 may allow each side wall 122 to abut a toe of one of the flanges 54, 56 of the intersecting beams 50, 52.

The base portion 110 may include a securing or bottom plate 112 arranged at one end and a securing or top plate 114 arranged at the other end. The top and bottom plates 112, 114 may mirror one another and, as such, only one has been described. As shown, for example, the bottom plate 112 may include a substantially flat and circular clamping or upper surface 128 having a perimeter 137 and from which the base portion 110 may extend. The bottom plate 112 may have a substantial thickness 139 equal to approximately ⅛ to ¾ of the diameter defined by the perimeter or approximately equal to ¼ to ½ of the diameter or approximately ⅓ of the diameter. Still other aspect ratios of the bottom and top plates 112, 114 may be provided. The bottom plate 112 may have an arcuate outer wall 130 arranged along a perimeter 141 slightly larger than the perimeter 137 of the clamping surface 128 and a chamfered upper and lower surface of the bottom plate 112 may extend upward or downward and from the inner perimeter 137 to the outer perimeter 141. The bottom plate 112 may have a substantially flat and circular bottom surface having a perimeter equal to that of the clamping surface 128. The top and bottom plates 112, 114 may, thus, have opposing similarly shaped clamping surfaces 128 defining a mouth 116 between the surfaces 128, the top and bottom plates 112, 114 acting like an upper and lower jaw, respectively, or an upper and lower awning, respectively.

Figure 6:
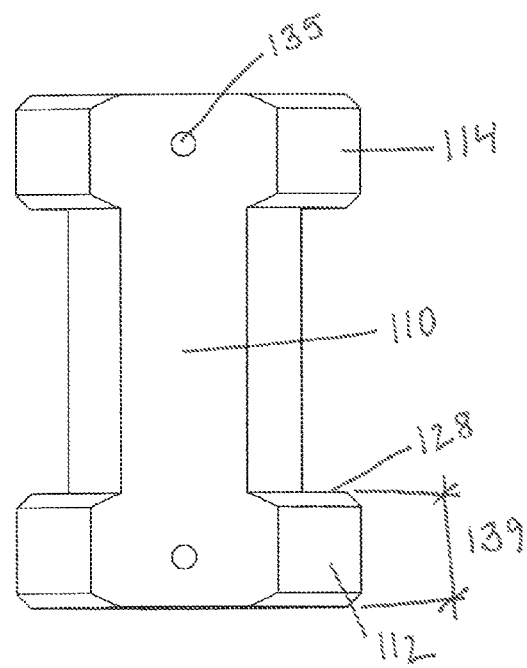
FIG. 6 is a rear view of the beam clamp of FIG. 5, according to one of more embodiments.
Figure 7:
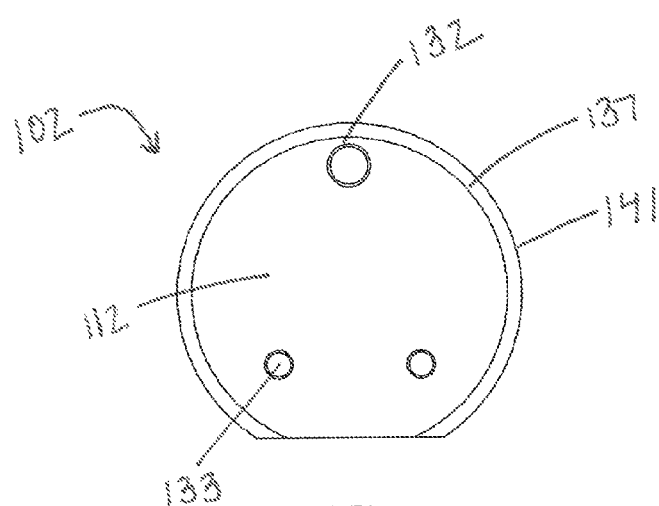
FIG. 7 is a top view of the beam clamp of FIG. 5, according to one of more embodiments.

One or both of the top and bottom plates 112, 114 may include a bore 132 extending through the thickness of the plate for receiving a pinching or setting fastener. The bore 132 may be arranged on a line that bisects the cross-sectional shape of the base 110 and extends through the center point. The bore 132 may be positioned substantially adjacent the perimeter of the clamping surface 128. In some embodiments, the bore 132 may be immediately adjacent the perimeter of the clamping surface 128 such that the thickness of the wall of the bore 132 on its outboard edge is substantially equal to the difference in the radius of the clamping surface perimeter 137 and the radius of the slightly larger outer wall perimeter 141 divided by two. In some embodiments, the bore 132 may be threaded bore for receiving a set screw or bolt. The top and bottom plates 112, 114 may also include bores 133 extending into the thickness of the plates for securing of a brace or braces 104 as described in more detail below. The bores 133 may be threaded bores for receiving screws or bolts to secure the brace or braces 104. Still further, the top and bottom plates 112, 114 may include a bore 135 extending through the segmented portion of the perimeter defined by the chamfered portion. These bores 135, shown in FIG. 6, for example may extend along a line parallel to the clamping surface 128 and top/bottom surface. These bores 135 may also be threaded and adapted for attaching the handle with bolts or screws, for example.

All or substantially all of the clamp 102 may be chamfered for accommodating a handle. As shown, the clamp 102 may be chamfered defining a chamfered portion of the top and bottom plates 112, 114 creating a segment portion of the circular perimeter and also defining the back wall of the base 110 described above.

In some embodiments, the clamp 102 may have an overall height ranging from approximately 6 inches to approximately 24 inches, or from approximately 8 inches to approximately 12 inches, or a height of 9 inches may be used. The circular top and bottom portions 112, 114 may range in diameter from approximately 3 inches to approximately 12 inches, or from approximately 4 inches to approximately 8 inches or a diameter of approximately 6 inches may be used. The thickness of the top and bottom portions 112, 114 may range from approximately ½ inch to approximately 4 inches or from approximately 1 inch to approximately 3 inches or a thickness of approximately 2 inches may be used. The size of the base portion 110 may be defined by the overall length of the clamp and the size of the top and bottom portions.

Figure 9:
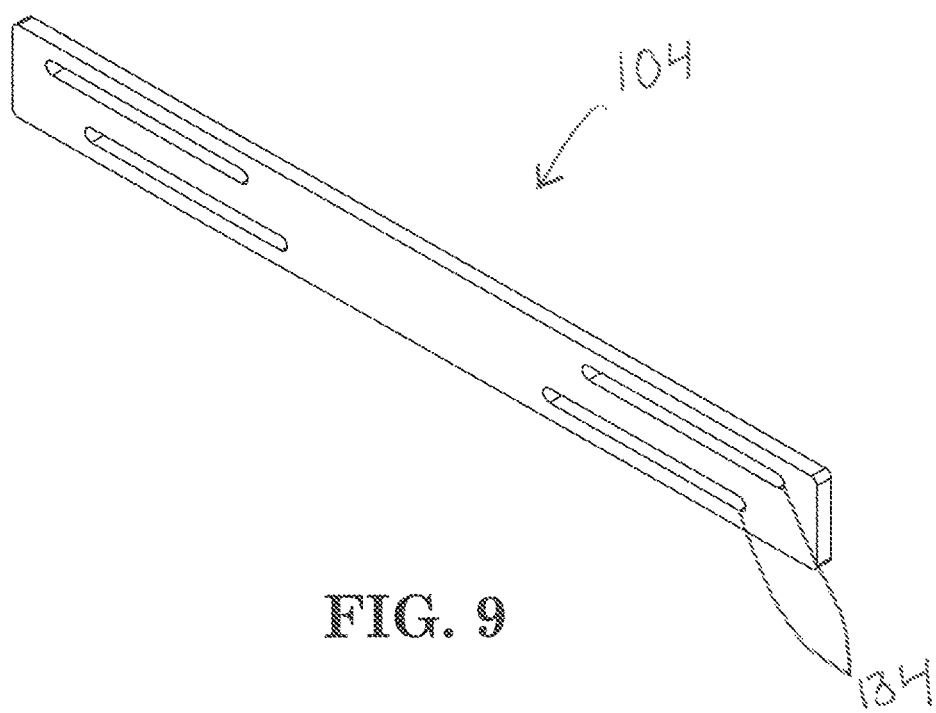
FIG. 9 is a perspective view of a brace of the beam clamp assembly of FIG. 1, according to one of more embodiments.

Referring now to FIG. 9, a brace 104 is shown. The brace 104 may be a substantially plate-like element configured to span from one beam clamp 102 to another to maintain the relative position of the clamps 102. As shown, the brace 104 may include a pair of slotted holes 134 at each end configured for aligning with the bores extending into the top and bottom of the clamps 102. The slotted holes 134 in the brace 104 may be spaced apart from one another by approximately the spacing between the clamp holes multiplied by the cosine or sine of 45 degrees. The overall length of the brace 104 may range from approximately 12 inches to approximately 56 inches, or from approximately 24 inches to approximately 48 inches, or a length of approximately 36 inches may be used. Still other lengths within or outside the ranges mentioned may be used. A first set of braces 104 may be may be arranged along the top of a pair of clamps 102 and extending from one brace 104 to another along the transfer beam 50 and on each side of the transfer 50 beam. Another set of braces 104 may be arranged along the bottom of a pair of clamps 102 and extending from one brace to another along the support beam 52 and on each side of the support beam 52. The braces 104 may be secured to the clamps 102 with a pair of screws or bolts 106 extending through the slotted holes and into the holes in top/bottom plate of the clamp.

Figure 10:
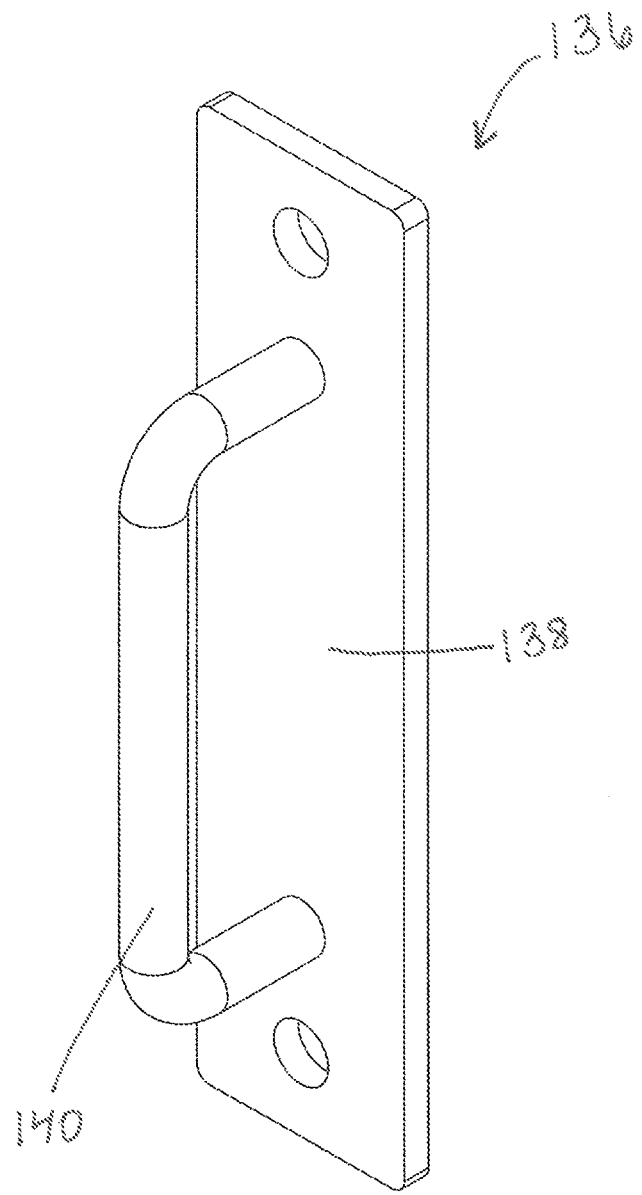
FIG. 10 is a perspective view of a handle of the beam clamp of FIG. 5, according to one of more embodiments.

Referring now to FIG. 10, a handle 136 is shown. The handle 136 may include a base plate portion 138 and a U-shaped handle 140. The base plate portion 138 may be configured for attachment to the chamfered surface of the clamp 102 and may be secured to the chamfered surface by way of a screw, bolt, or other fastener and into the horizontally extending bores 135 in the top and bottom plates 112, 114. Larger or smaller handles 136 may be used and may be secured to the base portion 110 in lieu of the top and bottom portion 112, 114. In other embodiments, multiple handles may be used. In various embodiments, the material, or combination of materials, used to create the clamp may include, but is not limited to steel, titanium, lead, iron, aluminum, any other suitable material, or any other strong durable material.

The clamps 102 described may be used to secure a transfer beam 50 to a support 52 beam. As shown in FIGS. 1-4, when a transfer beam 50 is arranged on a support beam 52, a clamp 102 may be placed in each of the four quadrants of the intersection. The clamp 102 may be lifted by the handle 136 and positioned so as to force the side walls of the base portion 110 into the corner defined by the crossing flanges of the beams 54, 56. The bottom flange 54 of the transfer beam 50 and the top flange 56 of the support beam 52 may, thus, each be received by the mouth 116 of the clamp 102 and the diamond-shaped cross-section of the base 118 may cause the clamp 102 to naturally be guided into the corner defined by the flanges 54, 56 of the two beams 50, 52. Once positioned deep into the corner, the set screw/bolt 108 in the top of the clamp 102 may be turned through the top of the clamp 102 and against the top surface of the bottom flange 54 of the transfer beam 50 thereby lifting the bottom plate 112 of the clamp 102 against the bottom surface of the top flange 56 of the support beam 52 and pinching the two flanges 54, 56 together creating a friction fit. Once the clamps 102 are positioned, the braces 104 may be positioned across the top of the clamps 102 along the transfer beam 50 and across the bottom of the clamps 102 along the support beam 52. The braces 104 may be secured to the clamps 102 with screws or bolts or other fasteners 106.

It is to be appreciated that the symmetrical and aligned shape of the mirrored top and bottom plates 112, 114 of the clamp 102 allow for a single set screw or at least a set screw or screws from a single side of the device. This is because when the pinching set screw in the present embodiment is tightened, it is aligned with and close to the center of the force distribution as the bottom plate 112 engages the bottom surface of the top flange 56 of the support beam 52. It is also to be appreciated that the torque required to engage the set screw may be less than the torque required when the clamping is provided in an offset position relative to the pinching location. This may be because, when the securing bolt is offset from the clamping location, prying action on the bolt requires that the bolt tension be quite high to develop a sufficient clamping force.

Still further it is to be appreciated that by focusing the amount of material where it is most useful (i.e., at or around the regions of clamping) and reducing the amount of material where it is less stressed (i.e., when tying clamps together), the overall system weight may be reduced considerably. That is, the clamps 102 themselves may relatively robust, but the braces 104 extending between the clamps may be relatively thin and/or narrow. As a result, the clamps 102 may range in weight from approximately 30 lbs. to approximately 50 lbs. or the clamps 102 may be approximately 40 lbs. This provides for a large advantage over other known clamps weighing 500-700 lbs. because it allows for workers to handle the clamps 102 without the need for a crane, forklift, or other heavy equipment.

Figure 11:
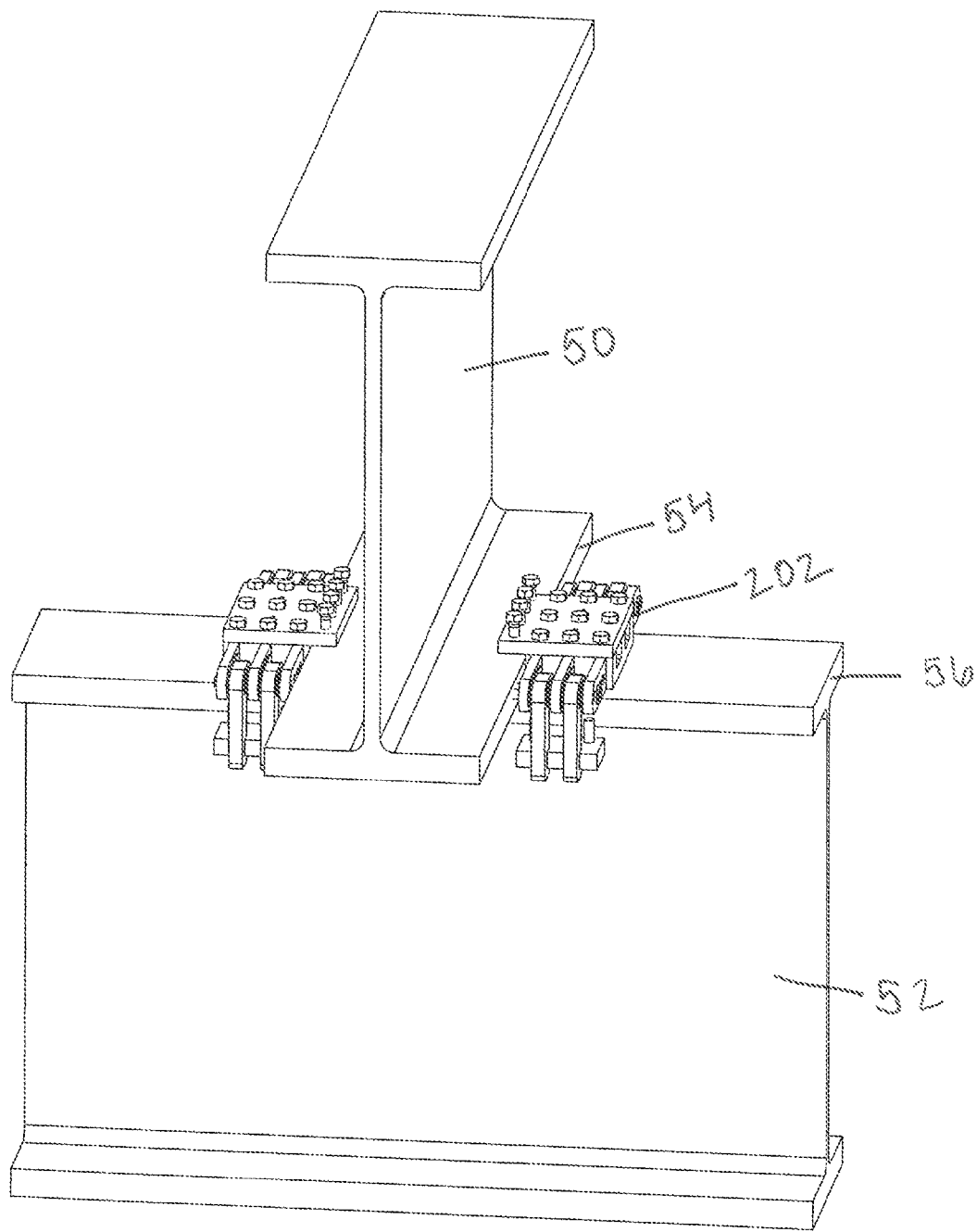
FIG. 11 is a perspective view of another beam clamp assembly, according to one or more embodiments.
Figure 12:
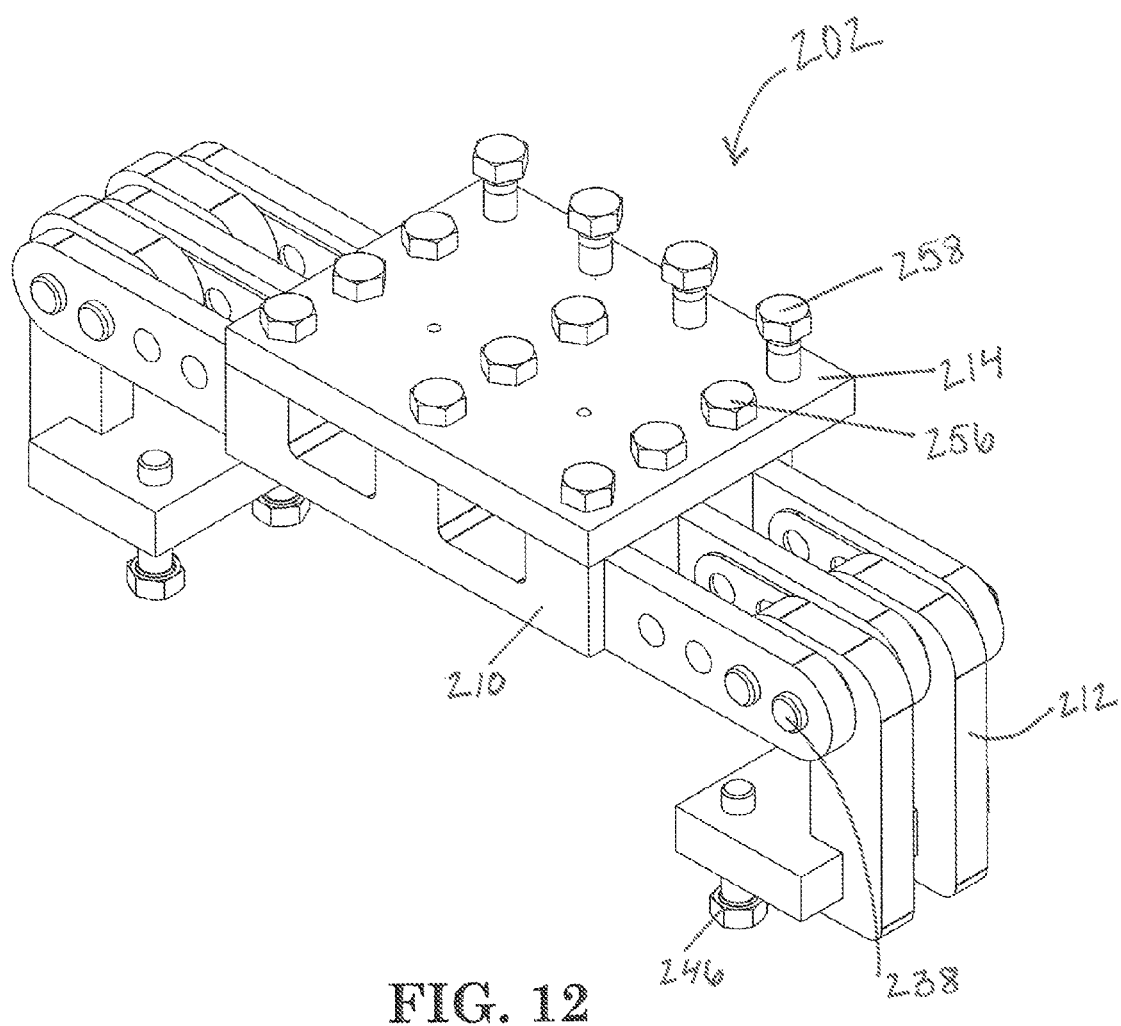
FIG. 12 is a perspective view of a beam clamp of the assembly of FIG. 11, according to one or more embodiments.

Referring now to FIGS. 11 and 12, another particular embodiment of a beam clamp is shown. As shown, the beam clamp 202 may be used to secure a transfer beam 50 to a rig or support beam 52. In various embodiments, a beam clamp 202 may be secured to a top flange 56 of rig beam 52 on one or both sides of the transfer beam 50. The clamp 202 may additionally connect with a bottom flange 54 of the transfer beam 50. A clamp 202 connected in this manner may create an added friction force between the transfer beam 50 and the rig beam 52 (i.e., beyond the force due to bearing) sufficient to resist lateral motions from equipment motions, ocean movements, wind, seismic events, and the like.

As shown in perspective view of FIG. 12, the clamp 202 may include a base 210, one or more arms 212, and a top plate 214. The base 210 may be placed across a rig beam flange 56 and positioned to abut and extend adjacent to the bottom flange of the transfer beam 50. The arms 212 may be configured to, substantially yet temporarily, secure the beam clamp 202 to the rig beam 52 by extending downward past the top flange 56 of the rig beam 52 and under the top flange 56 of the rig beam 52. The top plate 214 may be configured to, substantially yet temporarily, secure the transfer beam 50 onto the rig beam 52 by extending inwardly across the surface of the bottom flange 54 of the transfer beam 50.

As may be appreciated in reviewing the presently disclosed embodiments, relatively few and lighter parts that can be preassembled may be used in the present embodiment. As such the weight of the mechanical beam clamp may be reduced relative to known clamps, in some embodiments down to approximately 100 lbs., when compared to previously known assemblies of mixed and matched spacers, plates, and bolts that may weigh several hundred pounds. As such, the beam clamps may be simply lifted by two workmen, thereby forgoing the requirement for a crane. In addition, the simplified design may be relatively universally applied.

As seen in FIG. 12, a beam clamp 202 may generally be wholly or partially prefabricated or assembled before installation. A beam clamp 202 may be constructed with one or more components. In various embodiments, the beam clamp 202 components may include, but are not limited to, a base 210, one or more arms 212, and a top plate 214. In at least one embodiment, the base 210 and top plate 214 comprise the same structure.

Figure 13A:
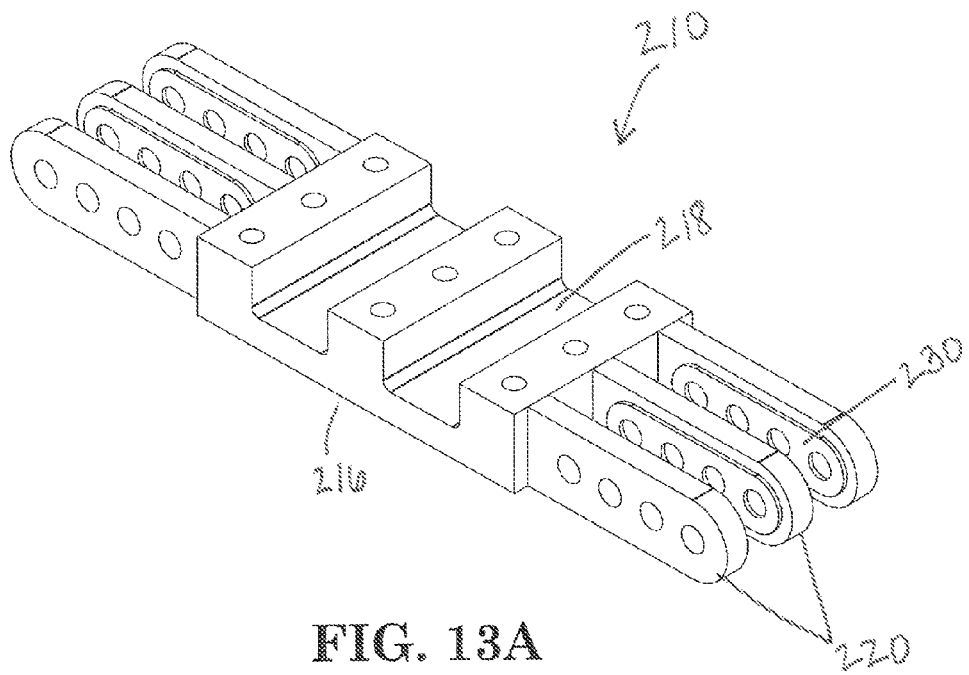
FIG. 13A is a perspective view of a base of the beam clamp of FIG. 12, according to one or more embodiments.
Figure 13B:
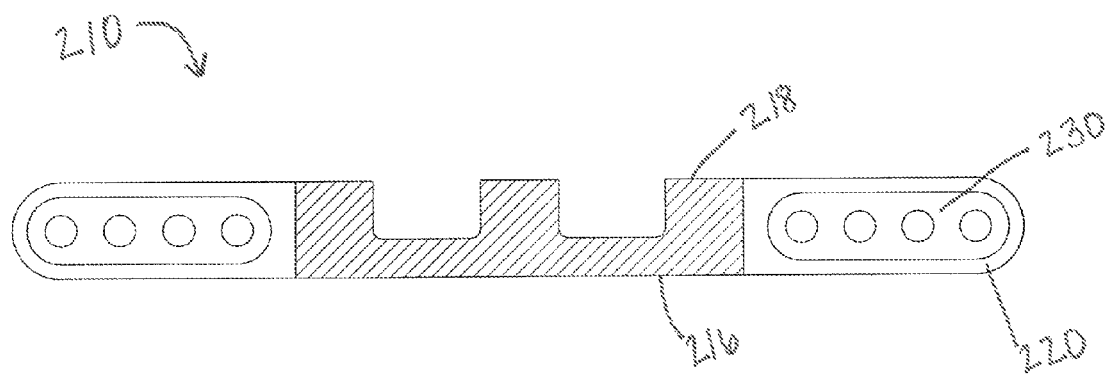
FIG. 13B is a side cross-sectional view of the base shown in FIG. 13A, according to one or more embodiments.

The base 210 may provide structural support to the beam clamp 202. In various embodiments, the base 210 may also serve as points of attachment for the top plate 214 and the one or more arms 212. FIGS. 13A and 13B show a perspective view and cross section view, respectively, of a base 210, according to one embodiment of the present disclosure. The base 210 may be generally flat on one side 216, such that it may lay flush on a flange of the rig beam 52. The base 210 may include a core portion 218 and one or more projections 220 extending laterally from the core portion. In various embodiments, the core portion 218 and one or more projections 220 may be one unitary structure. For example, the core portion 218 and projections 220 may be machined from a single piece of material or molded to form such a unitary structure. In some embodiments, the one or more projections 220 and the core portion 218 may comprise separate components. In such embodiments, the projections may be connected to the core portion prior to assembly, for example, by welding or otherwise securing the projections 220 onto the core portion 218.

Figure 14A:
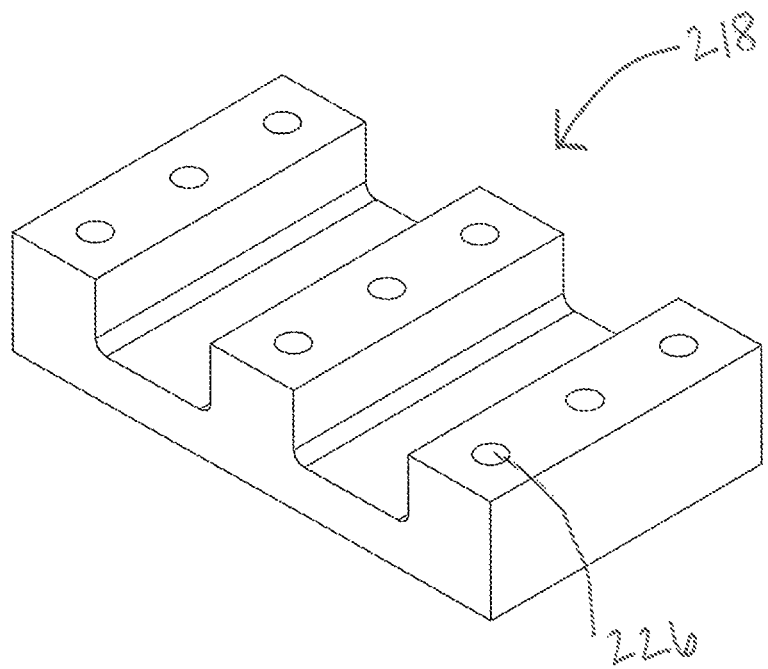
FIG. 14A is a perspective view of a core portion of the base of FIG. 13A, according to one or more embodiments.
Figure 14B:
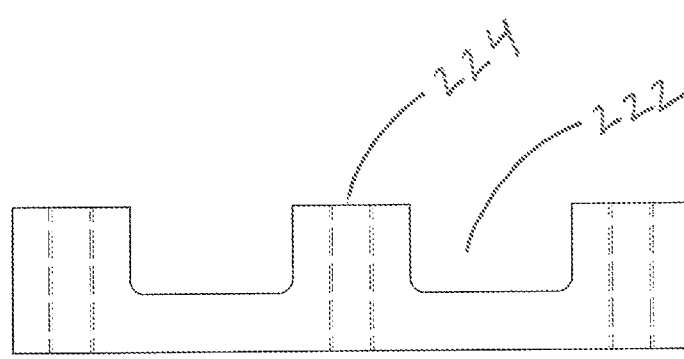
FIG. 14B is a side view of the core portion of FIG. 14A, according to one or more embodiments.

Further referencing FIGS. 14A and 14B, a core portion 218 is depicted as a separate component. It is to be appreciated that the core portion 218 may be the same or similar to the base 210 except that the projections 220 may be secured separately. Accordingly, reference herein to a particular part shown in FIG. 14A/B may be labeled with reference labels from both FIGS. 14A/B and 13A/B. In various embodiments, the core portion 218 may have one or more depressions 222, thereby creating one or more elevated securing blocks 224. In some embodiments, the depressions 222 may serve to reduce the overall weight of the beam clamp 202 by eliminating unnecessary material. The depressions 222 may be any suitable thickness or depth. In other embodiments, there may be no channel or depression 222, causing the core portion to be a substantially solid block. In other embodiments, there may be one, two, three, or more depressions 222. The one or more elevated securing blocks 224 may, generally, comprise a flat top surface, such that the top plate 214 may be secured substantially flush against the several flat topped blocks 224. In other embodiments the top plate 214 and elevated securing blocks 224 may align in a different manner, for example, using a tongue and groove approach or alignment pins/holes may be used. Each of the one or more elevated securing blocks 224 may include one or more screw/bolt holes 226. As seen in the embodiments shown in FIGS. 13A and 14A, each elevated securing block 224 may include three screw holes 226. It may be appreciated that in other embodiments, less than three or more than three screw holes 226 may be used. Each screw hole 226 may be configured to receive or connect with a securing mechanism, such as a bolt. For example, the screw hole 226 may be threaded.

The core portion 218 may be generally flat and rectangular, in some embodiments. The thickness of the core portion 218 may be selected to accommodate the clamping force on the transfer beam imparted on the base by the top plate and the projections. In some embodiments, the base 210 may be square or another shape and it may be relatively thick. As should be appreciated, any suitable size and shape may be used for the base 210 and the size, shape, and thickness may be coordinated with the size, shape, and thickness of the top plate 214 and the projections 220. The base 210 may be any suitable length, width, and thickness.

Figure 15:
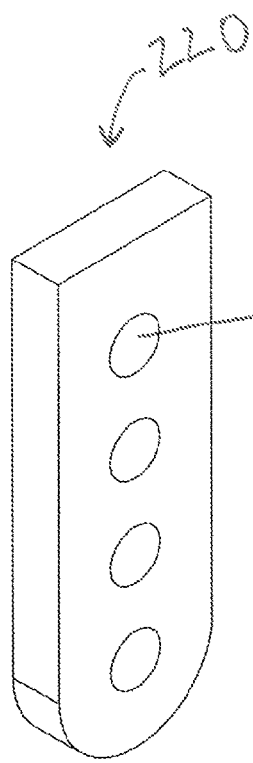
FIG. 15 is a perspective view of a projection of the base of FIG. 13A, according to one or more embodiments.
Figure 16:
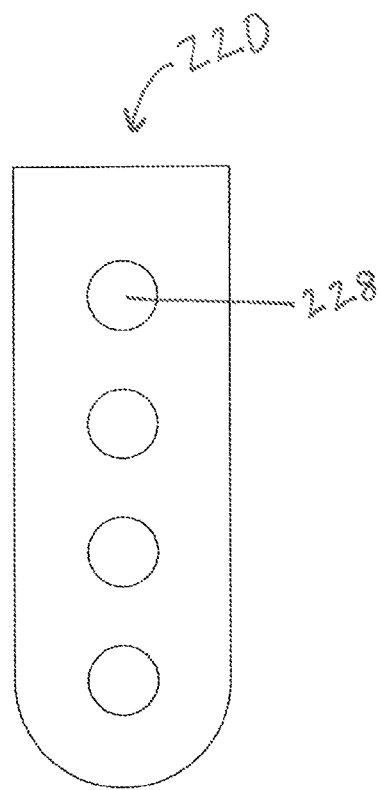
FIG. 16 is a side view of the projection of FIG. 15, according to one or more embodiments.

The projections 220, seen additionally as a separate component in FIGS. 15 and 16, may be welded, adhered, integral with, or otherwise connected to the base 210. In various embodiments, the projections 220 may be connected on opposing sides of the base plate 210. Each side may have zero, one or more projections 220. The projections may be substantially plate-like elements having a depth similar to the thickness of the core portion. The projections may be relatively thin in thickness and may have a length extending away from the core portion for accommodating one or more differing rig beam flange widths. The projections 220 may include one or more pin holes 228 extending through the thickness of the projections. The pin holes 228 may be configured to receive a pin, which may be used to connect the arm, discussed below. In some embodiments, each projection 220 may have four pin holes 228. In other embodiments, each projection 220 may have less than four or more than four pin holes 228. The projections may be any suitable length and width and may be designed to cantilever away from the core portion and resist bending forces imparted when the bolts in the arms are secured against the underside of the rig beam.

Figure 17:
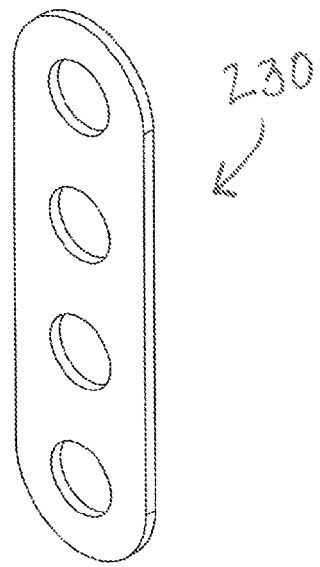
FIG. 17 is a perspective view of a projection spacer, according to one or more embodiments.

In some embodiments, as seen in FIG. 13A, a projection disc, washer, or spacer 230, seen additionally as a separate component in FIG. 17, may additionally be used. The projection spacer 230 may function to take up gaps between portions of the arm 212 that are positioned between the projections 220 and as such, may be positioned between the projections 220 and respective portions of the arms 212 and may be secured in place by pins passing through each portion. In other embodiments, the projection spacer 230 may mechanically connect with or be positioned against the projection 220. In various embodiments, the projection spacer 230 may be welded onto the projections 220. In other embodiments, the projection disc 230 may be glued onto the projections 220. In still other embodiments, the projection spacer 230 may be secured to the projections 220 using a friction fit. Any suitable method to secure the projection spacer 230 to the projections 220 may be used. In some embodiments, a projection spacer 230 may be configured to decrease the width of the gap between two projections 220. The projection disc 230 may be used to create a more secured fit between portions of the arms 212 and the projections 220. In some embodiments, a projection spacer 230 may, additionally or alternatively, be configured to absorb the wear created by the arm 212, thereby reducing or eliminating wear on the projections 220. The spacer may have one or more wear indicators to denote when the spacer should be replaced. For example, the spacer may have a protective color coding that will fade, shrink, or otherwise change color as the wear progresses. In various embodiments, no projection disc 230 may be used.

The base 210, including the core portion 218 and the projections 220, may be greater in width than the flange 56 of the rig beam 52. That is, the combined length of the core portion 218, and the projections 220 may be greater than the width of the flange 56. In other embodiments, the width of the core portion 218 may be less than or equal to the width of the flange 56. In various embodiments, the core portion 218 may be constructed from a light weight but durable material. In various embodiments, the material, or combination of materials, used to create the base section may include, but is not limited to, steel, titanium, lead, iron, aluminum, any other suitable metal, or any other strong durable material.

Referring back to FIG. 12, the arms 212 may be configured to secure the beam clamp 202 to the rig beam 52 by reaching around to the underside of the flange 56 of the rig beam 52 and interfacing therewith. The arms 212 may mechanically or physically connect to the base section 210. In various embodiments, the arms 212 may mechanically connect to the one or more projections 220. In various embodiments, the arms 212 may be removable from the base 210, such that they can be replaced as required, for example, by excessive wear or such that they may be positioned to accommodate varying width flanges on rig beams. In other embodiments, the arms 212 may be substantially permanently connected to the base 210. For example, in one embodiment, the arms 212 may be welded to the base 210. In another embodiment, the arms 212 may be molded onto or with the base 210, making it one unitary structure. The arm 212 may be comprised of one or more parts. In one embodiment, as seen in FIG. 18, the arm parts may include, but are not limited to, one or more shoulder plates 232 and a securing plate 234.

In various embodiments, the shoulder plates 232 (seen individually in FIG. 20) may mechanically connect with the base 210. As seen, each arm 212 may be comprised of two shoulder plates 232 that connect to the projections 220. It should be understood that any number of shoulder plates 232 may be used to connect to the projections 220 or base 210, including one, two, three, or more. The number of shoulder plates 232 may be coordinated with the number of projections 220 such that each shoulder plate 232 nests between a pair of projections 220. The shoulder plates 232 may include an upper portion for securing to the projections and a lower portion for reaching down past the flange of the rig beam. The upper portion, as shown in the embodiment of FIG. 18 and in FIG. 20, may have two eyelets 236. In other embodiments, the shoulder plates 232 may have one, two, three, or more eyelets 236. The one or more eyelets 236 may be generally configured to align with the one or more pin holes 228 of the projections 220. That is, the spacing between the eyelets 236 on the shoulders 232 may match the spacing between the pin holes 228 on the projections 220 allowing the arms 212 to be secured in a variety of positions along the length of the projections 220. A pin 238 (as seen in FIG. 12) may pass through each of the pin holes 228 and the one or more eyelets 236, thereby securing the shoulder plate 232 to the base section 210. The pin 238 may be removed. In various embodiments, the eyelets 236 of the shoulder plates 232 may be generally aligned with any of the pin holes 228 of the projections 220. That is, the arm 212 may be moved medially or laterally, thereby accommodating any size or configuration of beam.

Figure 21:
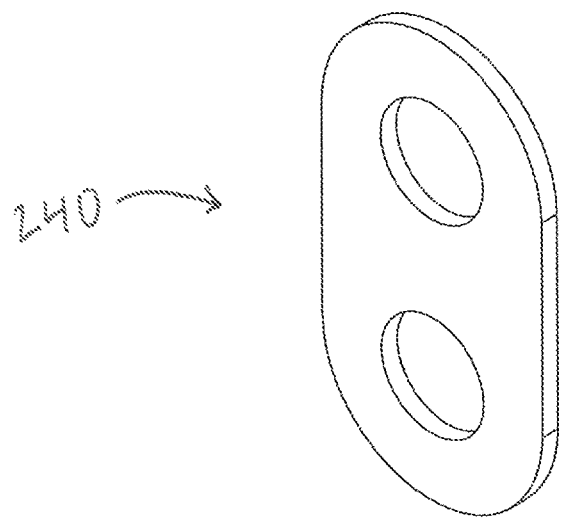
FIG. 21 is a perspective view of an arm spacer, according to one or more embodiments.

The shoulder plates 232 may additionally include an arm disc, washer, or spacer 240 (seen as an individual component in FIG. 21), in some embodiments. Similar to the projection spacer 230 discussed above, the arm spacer 240 may be positioned as a washer alongside the shoulder plates and secured in position by pins passing through the shoulders and projections. In other embodiments, the arm spacer 240 may mechanically connect with the shoulder plate 232. In various embodiments, the arm spacer 240 may be welded onto the shoulder plate 232. In other embodiments, the arm spacer 240 may be glued onto the shoulder plate 232. In still other embodiments, the arm spacer 240 may be secured to the shoulder plate 232 using a friction fit. Any suitable method to secure the arm spacer 240 to the shoulder plate 232 may be used. In some embodiments, an arm spacer 240 may be similarly configured to, additionally or alternatively to a projection spacer 230, provide a tighter fit for the arm between two projections 220. The arm spacer 240 may, additionally or alternatively, be configured to absorb any or all wear.

Figure 18:
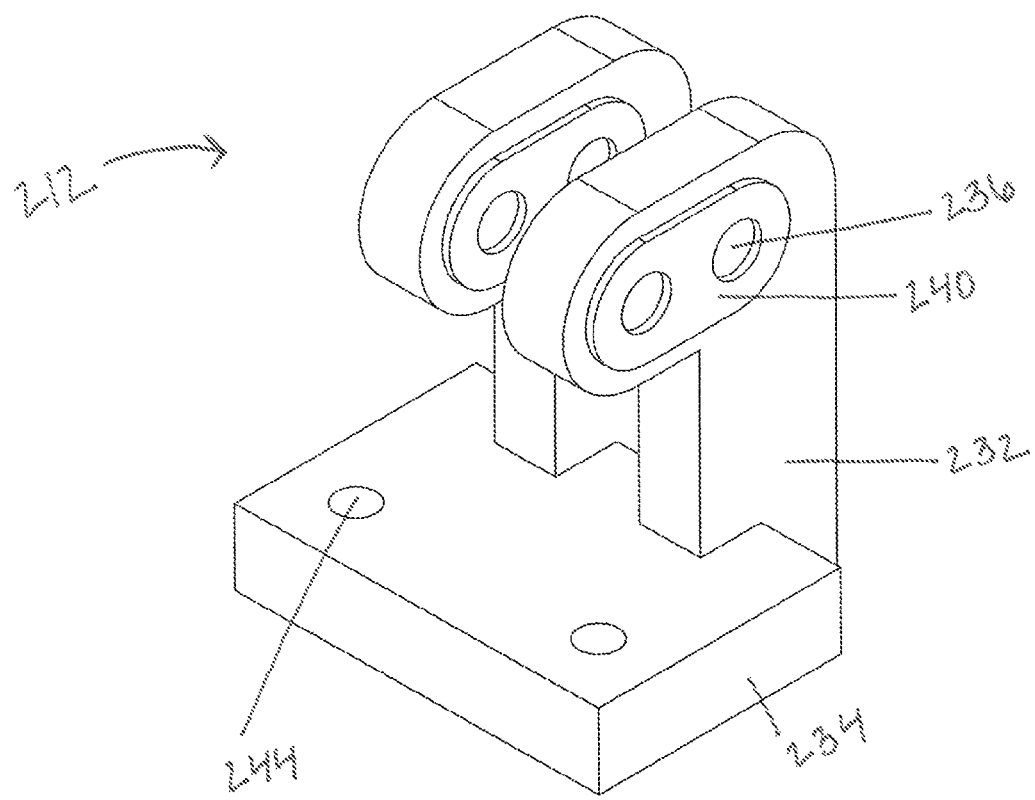
FIG. 18 is a perspective view of an arm of the beam clamp of FIG. 12, according to one or more embodiments.
Figure 19:
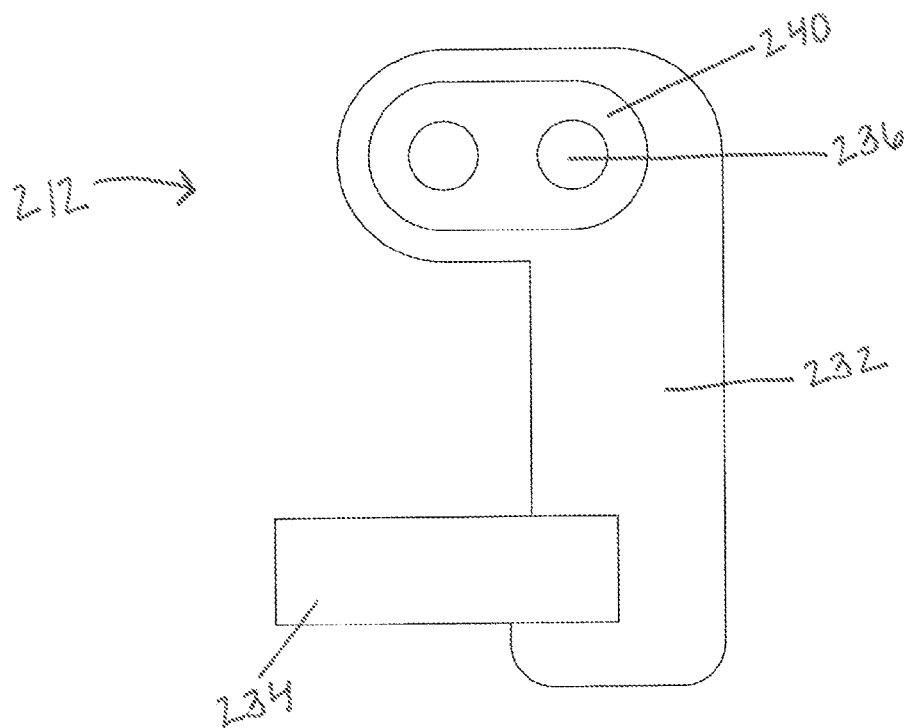
FIG. 19 is a side view of the arm of FIG. 18, according to one or more embodiments.
Figure 20:
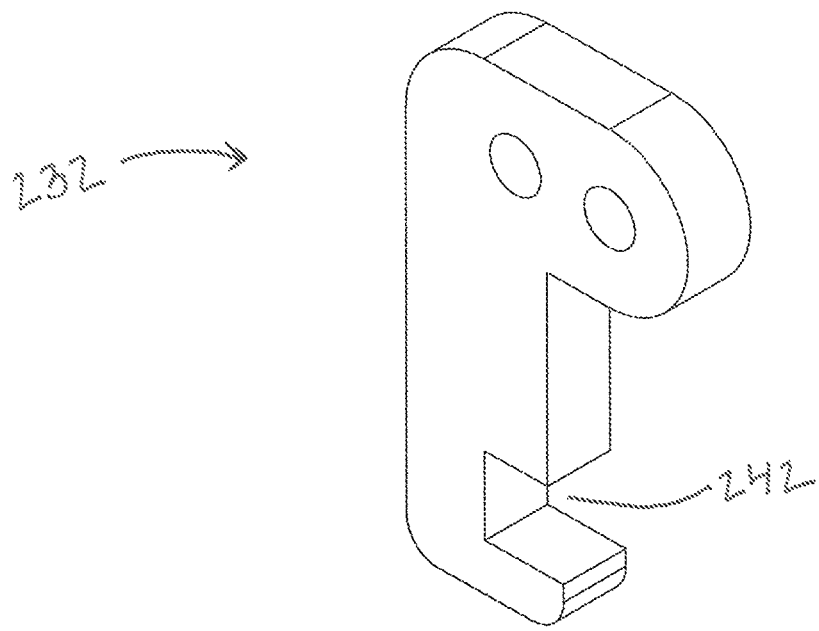
FIG. 20 is a perspective view of a shoulder plate of the arm of FIG. 18, according to one or more embodiments.

With continued reference to FIGS. 18, 19, and 20, the lower portion of the shoulder plates 232 may include a slot 242. The slot 242 may be configured to rigidly secure the securing plate 234 to the shoulder plate or plates. The slot may extend inwardly into the lower portion of the shoulder plate and may have slot width approximately equal to the thickness of the securing plate 234. The depth of the slot may be selected to accommodate a sufficient amount of overlap between the securing plate 826 and the shoulder plate without compromising the strength of the shoulder plate.

The securing plate 234 (seen as an individual component in FIG. 22) may be configured to mechanically connect with the one or more shoulder plates 232. In some embodiments, the securing plate 234 may be configured to fit into the slot 242 of the shoulder plates 232 thereby forming a friction fit. In other embodiments, the securing plate 234 may be bolted to the shoulder plates 232. In still other embodiments, the securing plate 234 may be glued, welded, or otherwise affixed to the shoulder plates 232. In at least one embodiment, the securing plate 234 and the one or more shoulder plates 232 may be comprised of a single molded, cut, machined, or otherwise fabricated part forming a one unitary structure.

Figure 22:
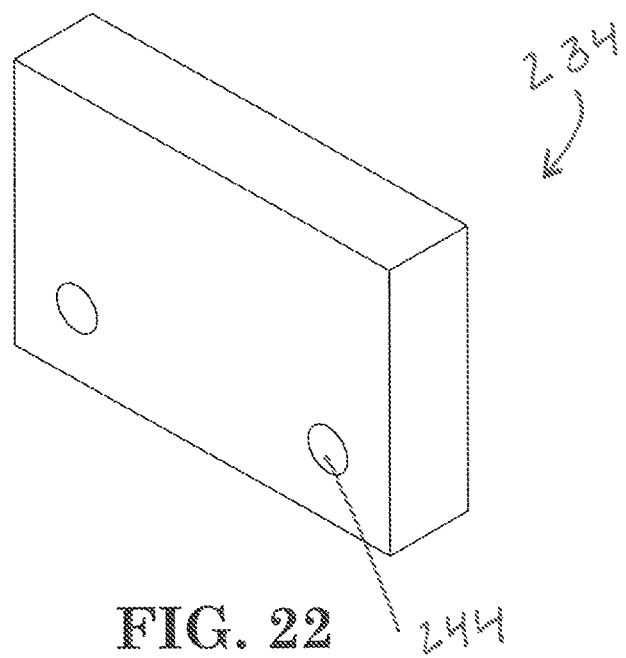
FIG. 22 is a perspective view of a securing plate, according to one or more embodiments.

The securing plate 234 may, additionally or alternatively, be configured to mechanically connect, directly or indirectly, with the flange 56 of the rig beam 52. As seen in FIGS. 18 and 22, the securing plate may have one or more eyelets 244. The eyelets 244 may be configured to receive a bolt, or some other securing mechanism. In some embodiments, the eyelets 244 may be threaded. A bolt 246 (as seen in FIG. 12) may be threaded into the eyelet 244. The bolt 246 may be configured to physically engage the underside of the flange 56 of the rig beam 52 when tightened. In some embodiments, a jam nut may be used to further secure the bolt 246 and prevent unscrewing or other loosening of the bolt. In at least one embodiment, the shoulder plate 232 may, additionally or alternatively, be configured to elongate or shorten; the latter bringing the securing plate 234 into contact with the flange 56 of the rig beam 52. Any suitable method to secure the arm 212 and/or securing plate 234 to the flange 56 of the rig beam 52 may be used. Furthermore, any suitable method to secure the base section 210 to the rig beam may be used.

As may be appreciated, an arm 212 or shoulder plate 232 that is secured with one pin may generally be able to rotate. The secured arm 212 may be connected using the pin and then rotated into position, such that the securing plate 234 may be configured to connect to the flange 56 of the rig beam 52. In some embodiments, a second pin 238 may additionally or alternatively be used to secure the shoulder plate 232 to the projections 220. An arm 212 secured with two or more pins 238 may be prevented from further rotation. As such, in some embodiments, the arm 212 may then be secured using bolt 246. As may also be appreciated, one or more arms 212 may be affixed on either side of the base section 210 and the arms 212 may be separate components or secured to adjacent arms. For example, a base section 210 having 5 projections 220 on either side may be configured such that four arms 212 may be connected to the base section 210, two on each side. Of course, if the arms 212 are connected to the base section 210 using a single shoulder plate 232, eight arms 212 may be capable of connecting the base section 210, four on each side. One skilled in the art may appreciate that any suitable combination or configuration is possible.

In various embodiments, the material, or combination of materials, used to create the arms and its constituent parts may include, but is not limited to, steel, titanium, lead, iron, aluminum, any other suitable metal, or any other strong durable material.

Figure 23:
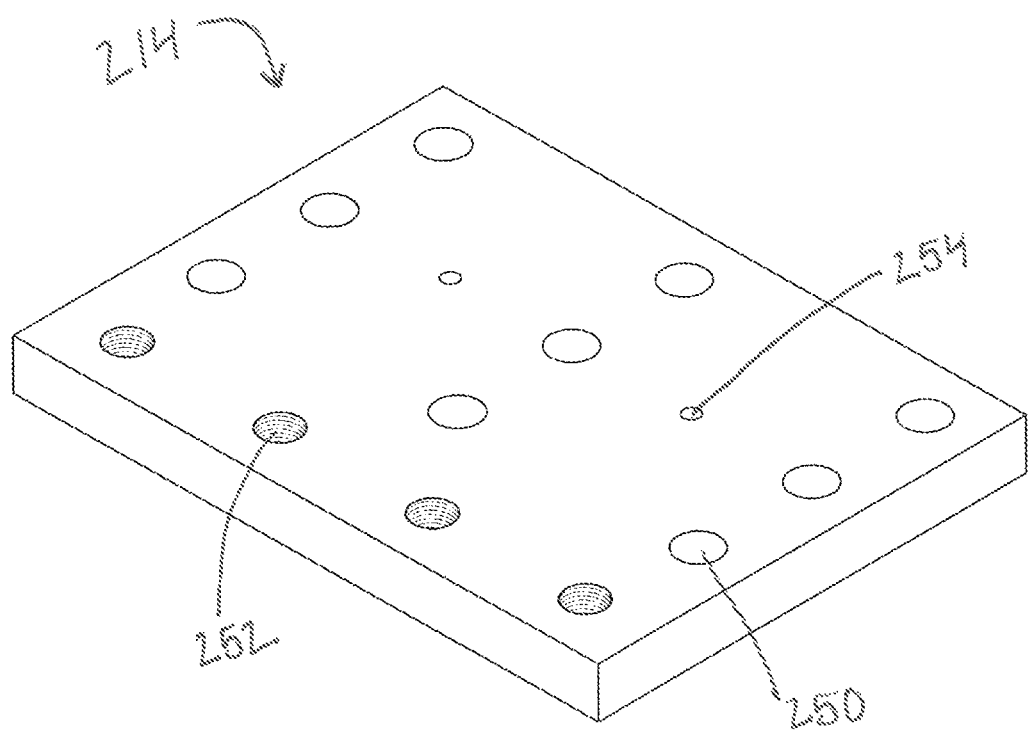
FIG. 23 is a perspective view of a top plate, according to one or more embodiments.

Referencing back to FIG. 12 and to FIG. 23, a top plate 214 may connect to the base 210. In various embodiments, the top plate 214 may be removable from the base 210, such that it can be replaced as required, for example, by excessive wear. In other embodiments, the top plate 214 may be substantially permanently connected to the base 210. For example, in one embodiment, the top plate 214 may be welded to the base 210. In another embodiment, the top plate 214 may be molded onto or with the base 210, making it one unitary structure. The top plate 214 may be used to connect, directly or indirectly, the beam clamp 202 to the flange 54 of the transfer beam 50. In some embodiments, the connection may be achieved through use of a securing awning.

Figure 24:
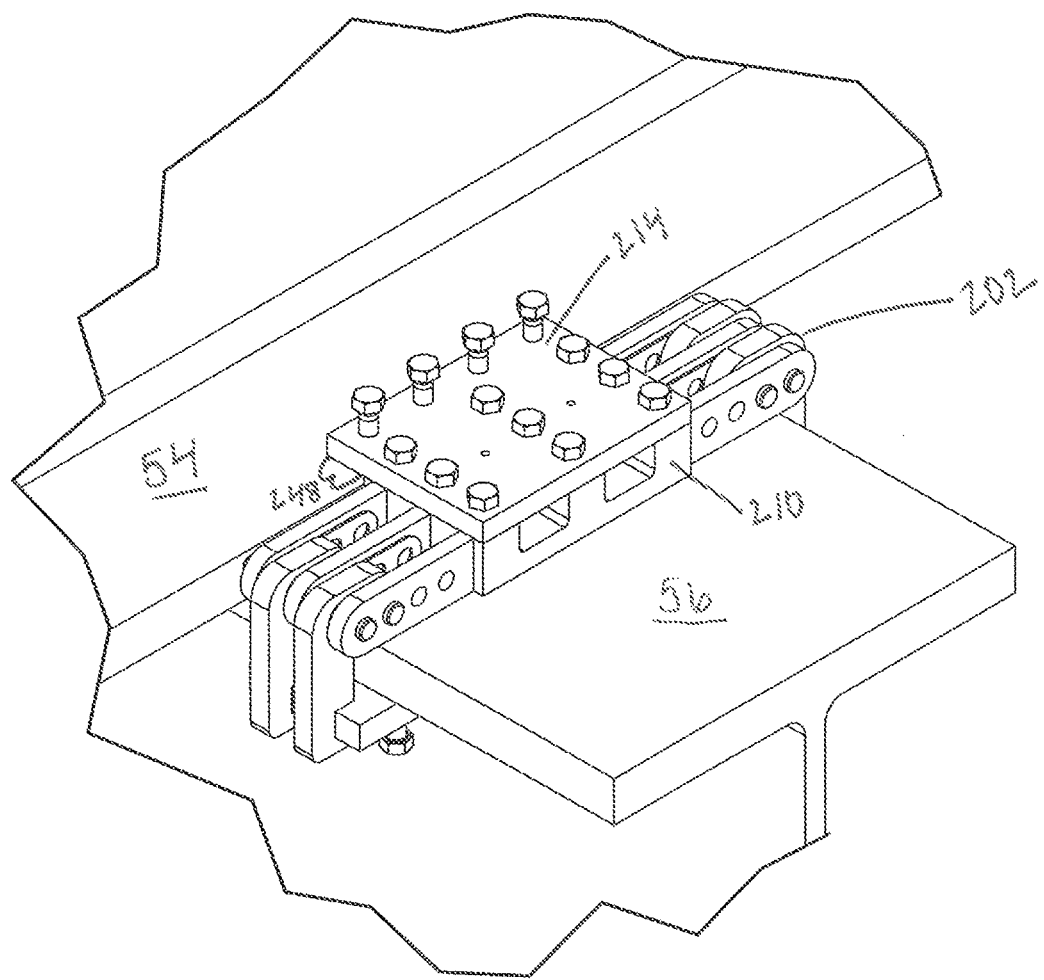
FIG. 24 is a perspective close-up view of the beam clamp of FIG. 12, according to one or more embodiments.

A securing awning may be a particularly novel advantage of the present disclosure. In various embodiments, the top plate 214 may include an overhang or securing awning (as seen in FIG. 24 as securing awning 248). That is, the securing awning 248 may be a portion of the top plate 214 that extends out over the base 210. In other embodiments, the securing awning 248 may be a component of the base 210. Any suitable method of creating a securing awning 248 may be used. The securing awning 248 may be configured to connect, directly or indirectly, with the top surface of the flange 54, which may, in part, secure the transfer beam 50 to the rig beam 52.

The top plate 214, seen as an individual component in FIG. 23, may, in some embodiments, include one or more top plate eyelets or bores 250, one or more top plate screw holes 252, and one or more swivel shackle holes 254. The one or more top plate eyelets or bores 250 may be configured to generally align with the one or more screw holes 226 of the core portion of the base. A bolt 256 (seen in FIG. 12) threaded through the top plate eyelet 250 and screwed into the threading of the screw hole 226 may substantially secure the top plate 214 to the base 210. The eyelets or bores 250 may be substantially thread free so as to allow the bolt to draw the top plate tight against the base section. In some embodiments, jamb nuts, adhesive or other loosening prevention measures may be implemented to maintain the top plate in a secured condition against the base section.

The one or more top plate screw holes 252 may be located on the securing awning 248. The one or more top plate screw holes 252 may each be configured to receive a securing mechanism, such as a bolt 258 (as seen in FIG. 12). In various embodiments, each top plate screw hole 252 may include internal threading, used to receive the bolt 258. The securing awning 248 may be configured to interface, indirectly or directly, with top surface of the bottom flange 54 of the transfer beam 50. With reference to FIG. 24, a close up view of FIG. 11, the beam clamp 202 may be positioned on the rig beam flange 56 such that it directly abuts alongside the transfer beam flange 54. The top plate 214, when secured to the base 210, may create an overhang or securing awning 248, which may extend over the flange 54 of the transfer beam. A bolt 258 (seen also in FIG. 12) thread through the top plate screw hole 252 and tightened may cause the bolt 258 and/or the underside of the top plate's securing awning 248 to come in direct/indirect contact with the top side of the flange 54. In various embodiments, a jam nut may be used to keep the bolt 258 securely in place. In at least one embodiment, the jam nut may be used on the hex-head side of the top plate 214 in order to secure the bolt 258.

The one or more swivel shackle holes 254 may be used for transportation of the mechanical beam 202. In some embodiments, the swivel shackle holes 254 may be configured to pick up the mechanical beam clamp 202 using a crane. In some embodiments, the swivel shackle holes 254 may be, additionally or alternatively, configured to pick up using a forklift, such as while in an equipment yard. It may be appreciated that any suitable mechanism may, additionally or alternatively, use the shackle holes 254 to lift, transport, place, etc. the mechanical beam clamp 202.

As may be appreciated, the use of a securing awning 248 may reduce the torque required to secure the Devin beam onto the rig beam. Traditional beam clamps use a bolt to secure two plates together, the plates making contact with the beam. However, because the bolt was lateral to the flange 54, it required excessive tightening or torque, i.e., 469 ft. lbs., in order to successfully transfer the compression pressure to the plate that makes contact with the flange 54. This may have been because of the prying action of the plate on the bolt, which increased the torque necessary to develop a sufficient clamping force. By using the securing awning, the bolts may cause a more direct transfer of the compression pressure created by tightening the bolt onto the flange 54, thereby reducing the torque imparted by a user to generate the needed clamping force. In some embodiments, the torque required to tighten a mechanical beam clamp 202 of the present disclosure may be a fraction of what was previously required.

In various embodiments, the material, or combination of materials, used to create the top plate may include, but is not limited to, steel, titanium, lead, iron, aluminum, any other suitable metal, or any other strong durable material.

The following discussion is directed to a method of making and a method of use for the mechanical beam clamp of the present disclosure. It is to be appreciated that the steps of using a mechanical beam clamp can be implemented using any number of different embodiments.

The base 210 may be constructed using a variety of fabrication techniques. In various embodiments, the base 210 may be constructed from a metal alloy and may be machined to a particular shape, cast in a mold, or otherwise formed. In other embodiments, the core portion 218 may be individually machined and/or cast and the individual projections 220 may also be machined and/or cast. In this embodiment, the core portion 218 and projections 220 may then be affixed, such as by welding. The arms 212 and top plate 214 may similarly be machined and/or cast in respective molds. In some embodiments, the top plate 214 may be machined or case integrally with the core portion 218. In at least one embodiment, each of the base section 210, arms 212 and/or top plate 214 may then be placed into an injection mold component where a resin or other durable, yet wear resistant material, may encapsulate, wholly or partially, the components. The resin encasing may serve as a wear indicator, in some embodiments.

In various embodiments, the base 210, top plate 214, and arms 212 may be shipped along with the transfer beams to the site, such as an offshore drilling platform. In other embodiments, sites may be equipped with clamps. In some embodiments, the base 210 may be light enough, weighing approximately one hundred pounds, to be safely lifted by two workmen. After the transfer beam 50 is set on the rig beam or beams 52, the base 210 may be lifted onto the flange 212 of rig beam 102. The base section 210 may be positioned such that it directly abuts alongside the transfer beam flange 54 as it lies on the rig beam flange 56. An arm 212 may be generally aligned such that the eyelets 236 of the shoulder plates 232 may generally align with the pin holes 228 of the projections 220. A pin 238 may be inserted into a pin hole 228, thereby connecting the arm 212 to the base 210. The process of connecting an arm 212 to the base 210 may be repeated as necessary, i.e., to connect one or more arms 212 on either side of the base section 210.

The one or more arms 212, secured with one pin, may be capable of rotating. The arms 212 may be rotated such that the securing plate 234 may be positioned on the opposing side of flange 56 as the base section 210. In various embodiments, after the arm 212 has been rotated into place, one or more pin holes 228 may generally align with the one or more eyelets 236. In some embodiments, one or more pins 238 may additionally be used. That is, the one or more additional pins may be used to secure the arm 212 into place, thereby preventing further rotation. The one or more bolts 246 may then be inserted into the securing plate eyelets 244 and tightened. As the bolts 246 are tightened, a friction fit may be created by imparting tension in the arms 212 of the beam clamp 202 and drawing the base 210 tight against the top surface of the rig beam 52. The bolts 246 may be tightened to any suitable point and the torque used to tighten the clamp 202 onto the rig beam 52 may directly correlate to the clamping force provided. A jamb nut may be provided and tightened against the securing plate to resist loosening of the bolts 246.

The top plate 214 may then be placed on top of the base 210 such that the top plate eyelets 250 generally align with the screw holes 226. It is to be appreciated that the top plate 214 may have been previously installed on the base section 210 and may be lifted into place along with the base. The top plate 214 may be positioned such that a securing awning 248 is created over the flange 54. In the case of preassembly of the top plate 214 and the base 210, the base 210 may be oriented, when placed on the rig beam 52, such that the awning 248 extends over the top surface of the bottom flange 54 of the transfer beam 50. A bolt 256 may be inserted into the one or more top plate eyelets 250 and tightened. As such, the top plate 214 may become substantially secured to the base 210. One or more bolts 258 may then be inserted into the top plate screw holes 252. The bolts 258 may be tightened such that the tip of the bolts engages the top surface of the bottom flange 54 of the transfer beam 50 creating a friction fit. As can be appreciated, because the bolt 258 makes a more direct contact with the flange 54 than traditional beam clamps, the amount of torque required to tighten or secure the bolt 258 may be reduced and is directly related to the amount of force applied to secure the transfer beam. The bolts 258 may be tightened to any suitably desired level. In some embodiments, a jam nut may be used on the hex head side of the bolt 258 in order to further secure the top plate 214.

The method discussed herein may be repeated as necessary. For example, a mechanical beam clamp may be used to secure a transfer beam 50 to a rig beam 52 on both sides of the transfer beam 50 and at both ends of a transfer beam 50. That is, four mechanical beam clamps may be used to secure a Devin beam and a rig beam.

One or more of the presently disclosed embodiments may be particularly advantageous due to the reduced number of parts when compared to known devices thereby allowing a relatively quick install or uninstall time and a reduced number of pinch points. Some embodiments disclosed herein may be particularly advantageous due to reduced weight. In at least one embodiment, the base section may weigh approximately 100 lbs., and therefore may be lifted by two workmen. Furthermore, the mechanical beam clamp's securing awning may reduce the torque required to secure the transfer beam to the rig beam. Finally, the unique design and configuration may create a generally universal beam clamp, i.e., capable of being used to secure a variety of different beams and structures. Accordingly, the use of a mechanical beam clamp of the present disclosure may be more time efficient, safer, and universal in application.

Attached herein as "Appendix A" is one none limiting embodiment. Dimensions given are for example purposes only and should not be construed to impart any limitations on the various embodiments disclosed or contemplated by the present disclosure.

Various embodiments of the present disclosure may be described herein with reference to flowchart illustrations and/or block diagrams of methods, apparatus (systems), and computer program products. It is understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks. Alternatively, computer program implemented steps or acts may be combined with operator or human implemented steps or acts in order to carry out an embodiment of the invention.

Additionally, although a flowchart may illustrate a method as a sequential process, many of the operations in the flowcharts illustrated herein can be performed in parallel or concurrently. In addition, the order of the method steps illustrated in a flowchart may be rearranged for some embodiments. Similarly, a method illustrated in a flow chart could have additional steps not included therein or fewer steps than those shown. A method step may correspond to a method, a function, a procedure, a subroutine, a subprogram, etc.

As used herein, the terms "substantially" or "generally" refer to the complete or nearly complete extent or degree of an action, characteristic, property, state, structure, item, or result. For example, an object that is "substantially" or "generally" enclosed would mean that the object is either completely enclosed or nearly completely enclosed. The exact allowable degree of deviation from absolute completeness may in some cases depend on the specific context. However, generally speaking, the nearness of completion will be so as to have generally the same overall result as if absolute and total completion were obtained. The use of "substantially" or "generally" is equally applicable when used in a negative connotation to refer to the complete or near complete lack of an action, characteristic, property, state, structure, item, or result. For example, an element, combination, embodiment, or composition that is "substantially free of" or "generally free of" an ingredient or element may still actually contain such item as long as there is generally no measurable effect thereof.

In the foregoing description various embodiments of the present disclosure have been presented for the purpose of illustration and description. They are not intended to be exhaustive or to limit the invention to the precise form disclosed. Obvious modifications or variations are possible in light of the above teachings. The various embodiments were chosen and described to provide the best illustration of the principals of the disclosure and their practical application, and to enable one of ordinary skill in the art to utilize the various embodiments with various modifications as are suited to the particular use contemplated. All such modifications and variations are within the scope of the present disclosure as determined by the appended claims when interpreted in accordance with the breadth they are fairly, legally, and equitably entitled.

What is claimed is:

1. A beam clamp for securing a first beam to a second beam, the first and second beams being arranged in crossing fashion and defining one or more quadrants, the beam clamp comprising:
    a first clamping portion having a first clamping surface configured to engage a beam flange;
    a second clamping portion having a second clamping surface configured to engage a beam flange and being arranged in opposing relation to the first clamping surface defining a mouth;
    a base portion extending between the first and second clamping surfaces and having a wedge shape for engaging a corner defined by flanges of the crossing beams; and
    a securing mechanism configured for extending from one of the first and second clamping surfaces, into the mouth, to engage a surface a beam flange thereby pinching the flanges of the crossing beams together.

2. The beam clamp of claim 1, wherein the first and second clamping portions are substantially cylindrical having a generally circular clamping surface.

3. The beam clamp of claim 2, wherein the first and second clamping portions have a thickness ranging from approximately ⅛ to approximately ½ of the diameter of the clamping portion.

4. The beam clamp of claim 2, wherein the base portion is substantially diamond-shaped in cross-section and having a pair of sidewalls forming the wedge shape.

5. The beam clamp of claim 1, wherein the securing mechanism comprises a threaded bore extending through one of the first and second clamping surfaces and a set screw threadingly engaged in the threaded bore and extending substantially perpendicular to the respective clamping surfaces.

6. The beam clamp of claim 5, wherein the set screw extends from an outer side of the clamping portion, through the clamping portion, and into the mouth of the clamp.

7. The beam clamp of claim 6, wherein the threaded bore is arranged substantially adjacent to a perimeter of the clamping surface.

8. The beam clamp of claim 1, wherein the base portion has a cross-section in the form of a substantially ¼ pie and the clamping surfaces are generally circular having ¾ pie portion exposed and ¼ pie portion encompassed by the base portion.

9. The beam clamp of claim 8, wherein the securing mechanism is arranged in a quadrant of the clamping surfaces opposite that of the base.

10. The beam clamp of claim 1, further comprising a chamfered surface for attaching a handle.

11. The beam clamp of claim 10, wherein the chamfered surface extends the full height of the clamp.

12. A beam clamp assembly, for securing a first beam to a second beam, the first and second beams being arranged in crossing fashion and defining one or more quadrants, the beam clamp assembly comprising:
    a plurality of beam clamps each arranged in a quadrant, the beam clamps each comprising:
        a first clamping portion having a first clamping surface configured to engage a beam flange;
        a second clamping portion having a second clamping surface configured to engage a beam flange and being arranged in opposing relation to the first clamping surface defining a mouth;
        a base portion extending between the first and second clamping surfaces and having a wedge shape for engaging a corner defined by flanges of the crossing beams; and
        a securing mechanism configured for extending from one of the first and second clamping surfaces, into the mouth, to engage a surface a beam flange thereby pinching the flanges of the crossing beams together; and
    a brace comprising a substantially elongate member extending parallel to one of the crossing beams and securing one of the beam clamps to another beam clamp in an adjacent quadrant.

13. The beam clamp assembly of claim 12, wherein the plurality of beam clamps comprises four beam clamps.

14. The beam clamp assembly of claim 13, wherein the brace is configured for attachment to one of the first clamping portion and the second clamping portion.

15. The beam clamp assembly of claim 14, wherein the brace comprises a substantially flat plate having a pair of slotted holes at each end.

* * * * *